United States Patent Office 3,401,195
Patented Sept. 10, 1968

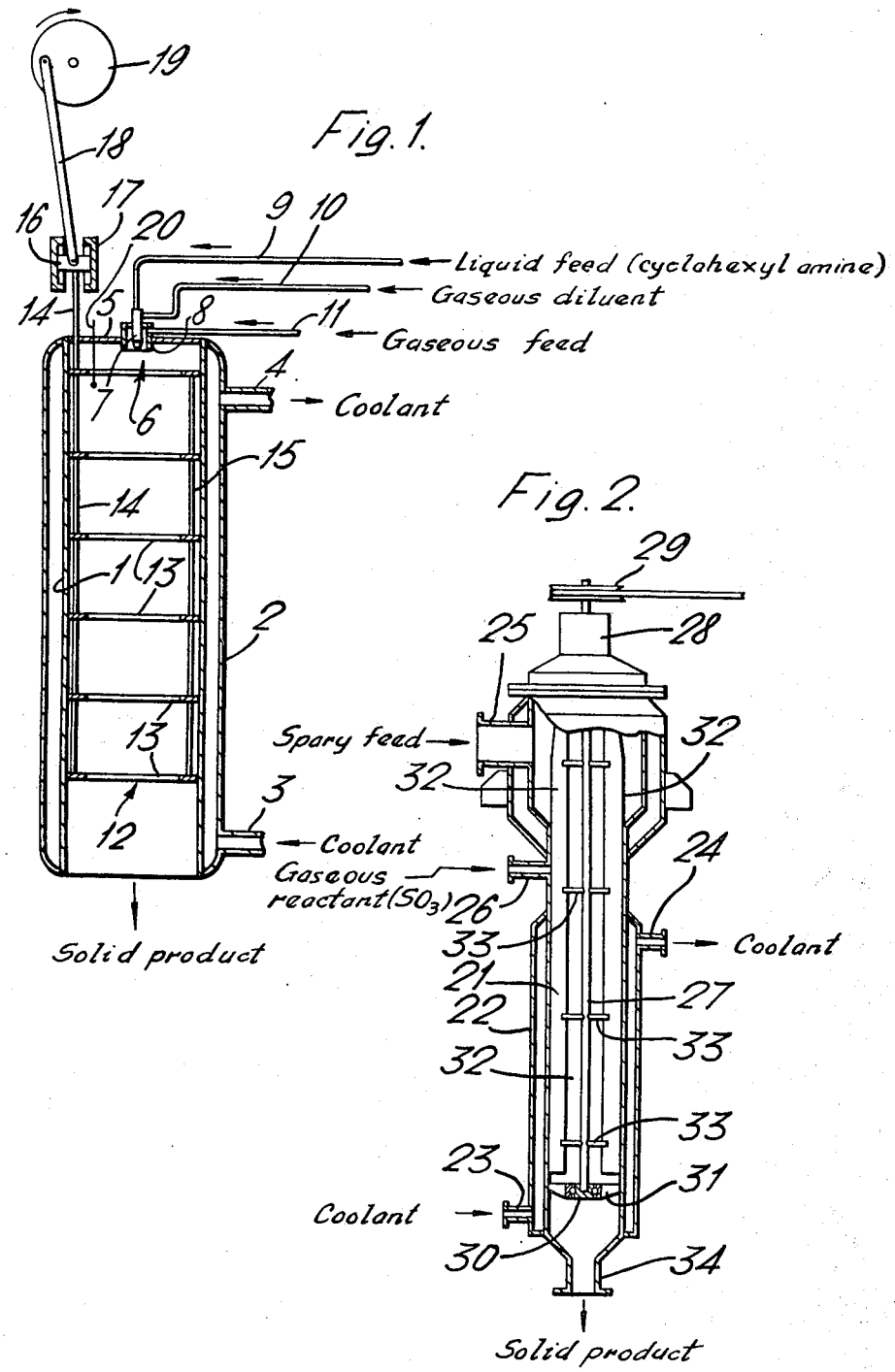

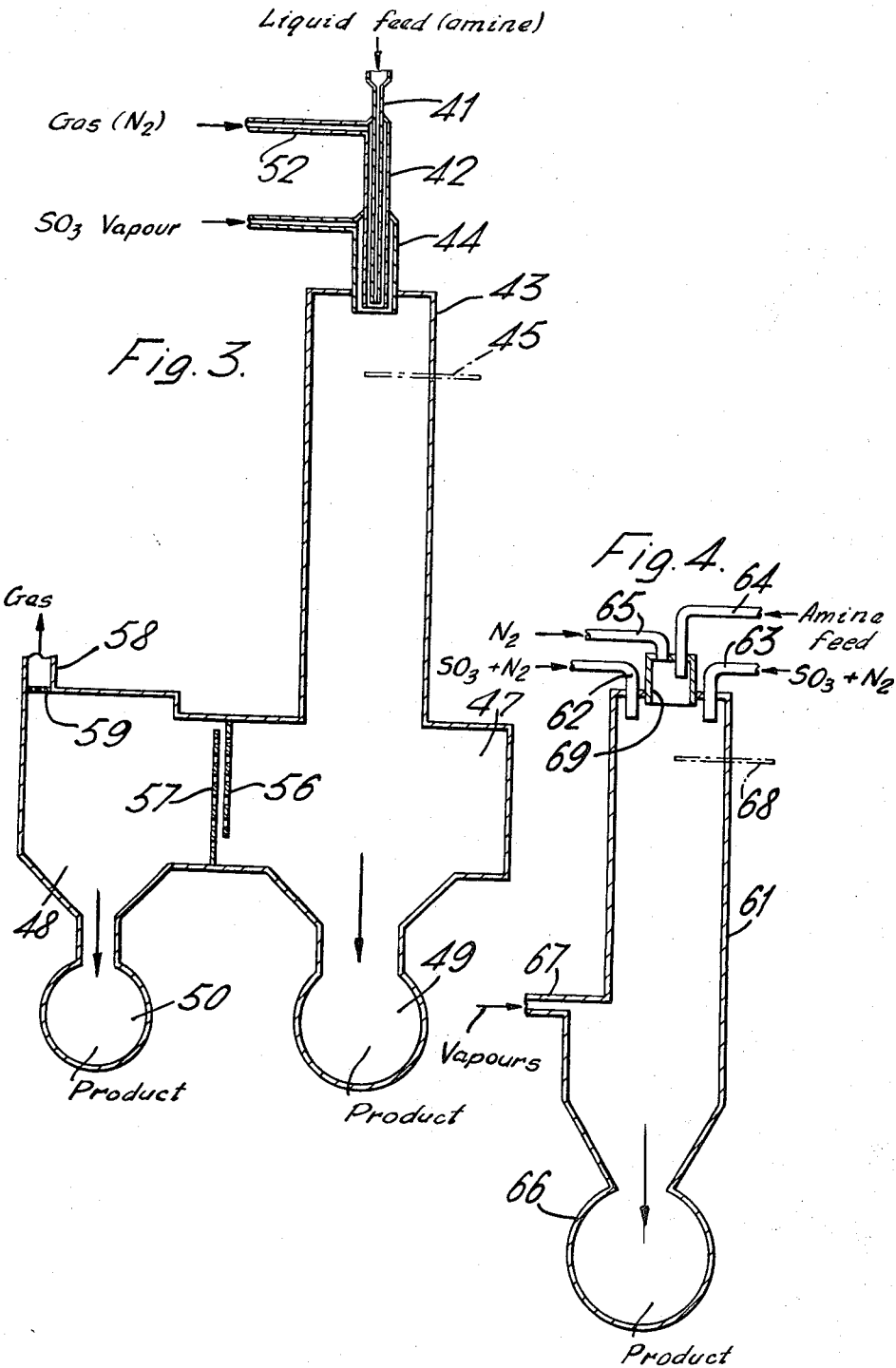

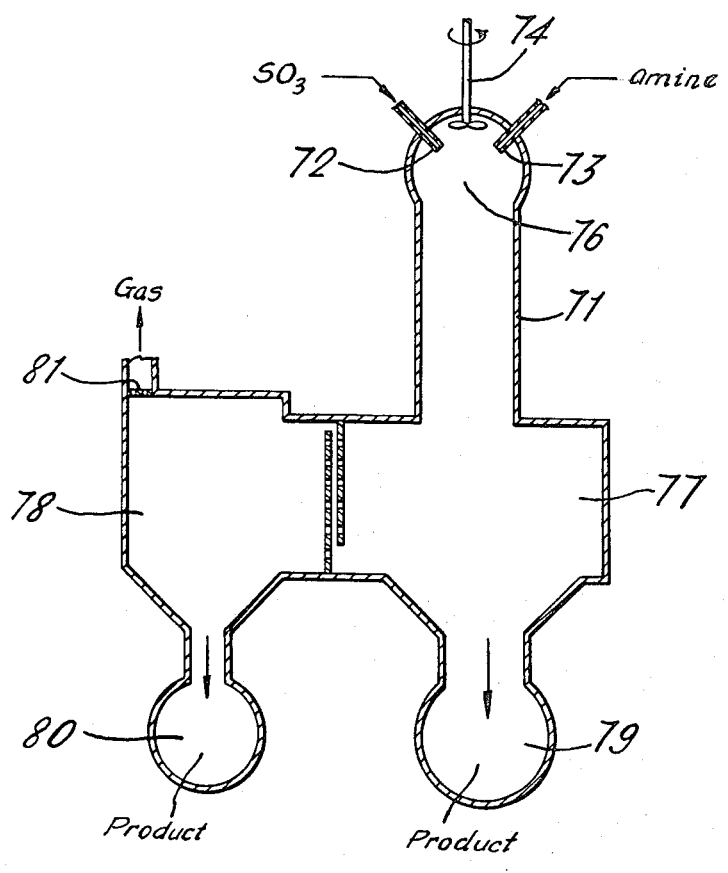

3,401,195
PROCESS OF PRODUCING SULPHAMIC
ACID DERIVATIVES
Clifford A. Crampton, 15 Wood End Road, Harpenden,
Hertfordshire, England; David G. Bowen, 378 Wanstead
Park Road, Cranbrook, Ilford, Essex, England; Charles
F. Cardy, 14 Mount Grace Road, Stopsley, Luton, Bedfordshire, England; and Arthur Poole, 9 Thurlow Drive,
Thorpe Bay Essex, England
Continuation-in-part of application Ser. No. 450,319,
Apr. 23, 1965. This application June 15, 1966, Ser.
No. 557,766
Claims priority, application Great Britain, Apr. 24, 1964,
17,139/64; Apr. 28, 1964, 17,607/64; July 14, 1964,
28,990/64; Aug. 26, 1964, 35,009/64; Apr. 5, 1966,
15,141/66
10 Claims. (Cl. 260—501.12)

ABSTRACT OF THE DISCLOSURE

A process for the production of cycloalkylammonium N-cycloalkyl sulphamates or isoalkylammonium N-isoalkyl sulphamates by introducing into a reaction zone sulphur trioxide vapour and the corresponding cycloalkylamine or isoalkylamine in the form of finely divided liquid or in the form of vapour under such conditions that a reaction takes place and the temperature in the reaction zone attains a temperature of at least 130° C. The compounds are intermediates useful in the production of the corresponding sodium N-cycloalkyl or sodium N-alkyl sulphamates.

This application is a continuation-in-part of application Ser. No. 450,319 filed Apr. 23, 1965.

The invention relates to a process for the production of derivatives of sulphamic acid.

It is an object of the invention to provide a process for the production of N-substituted sulphamates of improved colour.

It is a further object of the invention to provide a process in which N-substituted sulphamates may be obtained in high yield.

It is a particular object of the invention to provide a process for the production of a reaction product comprising cyclohexylammonium N-cyclohexyl sulphamate, which reaction product is of improved colour.

It is another object of the invention to provide a process whereby a mixture comprising cyclohexylammonium N-cyclohexyl sulphamate and N,N'-dicyclohexyl sulphonamide may be converted into a metal salt, for example the sodium or calcium salt, of N-cyclohexyl sulphamic acid without deterioration in colour.

According to the invention, a process for the manufacture of an N-substituted derivative of sulphamic acid comprises reacting a primary or secondary amine with sulphur trioxide, the amine in finely-divided, liquid form or in vapour form being contacted with sulphur trioxide vapour in a molar ratio of amine to sulphur trioxide of from 1.5:1 to 3.0:1 and the reaction being carried out at a temperature in the range 130–200° C. As the reaction is exothermic, it is preferably carried out under conditions such that a temperature of 130°–200° C. is attained.

The amine is advantageously a cyclo-alkylamine or an alkylamine, particularly a primary amine. The preferred cycloalkylamine is cyclohexylamine and the preferred alkylamines are isoalkylamines, particularly isoalkylamines containing from 3 to 8 carbon atoms in the alkyl group, for example isopropylamine, isobutylamine and isoamylamine.

The amine:sulphur trioxide molar ratio is advantageously from 1.9:1 or 1.95:1 to 3.0:1. The preferred molar ratio is, however, not less than 2:1 namely not less than that required to form the corresponding quaternary ammonium N-substituted sulphamate, that is, the amine salt. With cyclohexylamine the amine salt obtained is cyclohexylammonium N-cyclohexyl sulphamate $$C_6H_{11}NH_3 \cdot SO_3NHC_6H_{11}$$

The amine salt may, by the usual chemical methods, be converted into the acid or into a metal salt, for example, the sodium or calcium salt.

The use of amine:sulphur trioxide molar ratios higher than 3:1 leads to a deterioration in the colour of the crude reaction product.

The reaction is preferably carried out in the presence of a gaseous diluent which is inert under the reaction conditions. Suitable diluents include nitrogen and air, the air being preferably dry and free from carbon dioxide. The presence of moisture adds to sulphate contamination of the reaction product.

The two reactants are preferably fed into a reaction zone in separate streams, the sulphur trioxide being advantageously in admixture with an inert gaseous diluent. The amine may also be in admixture with an inert gaseous diluent when it contacts the diluted sulphur trioxide vapour. The amine is preferably contacted in finely divided, liquid form with the sulphur trioxide vapour and gaseous diluent may be advantageously employed to atomise or assist in atomising the liquid amine so that the latter comes into contact with the sulphur trioxide in the form of a fine spray or mist.

Control of the reaction temperature may be carried out by varying the concentration of the reactants, for example, by varying the proportion of gaseous diluent employed, and/or by varying the throughput rate and/or by preheating one or both reactants and/or by cooling the reaction zone.

In one method of carrying out the process, the reactants are brought into intimate contact with each other by injecting fine, liquid droplets of the amine and diluted sulphur trioxide vapour into a vertical column free from packing, baffles and the like. Such a method has been found to provide good control of reaction temperature and of the particle size of the amine salt.

Advantageous the sulphur trioxide is reacted with the amine under such conditions that the heat evolved in the reaction is sufficient to raise the reaction mixture to a temperature above 130° C. and advantageously to a temperature within the range 150 to 200° C. The reaction is preferably carried out at a temperature in the range 175–190° C. Temperatures below 175° C. tend to lead to incomplete reaction whilst temperatures above 190° C. give rise to charring and to increase in by-product formation.

In one preferred manner of carrying the invention into effect, the reactants are introduced into a reaction zone in two separate streams with the stream of one reactant, advantageously the amine disposed within the stream of the other reactant. Thus a stream of the amine in the liquid state may be fed through a jet to emerge as a fine spray in the reaction zone whilst sulphur trioxide vapour diluted with an inert gaseous diluent is fed into the reaction zone as a stream which surrounds the atomised amine. The spray of liquid amine entering the reaction zone is preferably as finely divided as possible; this increases conversion and avoids local overheating and avoids the consequent increase in the formation of by-products. The two streams are advantageously fed into the reaction zone through two coaxial tubes. In this manner the desired reaction temperature can be obtained and maintained with the higher concentration of reactants which is thereby possible so giving an improved throughput and frequently an improved yield.

The reactants are suitably fed vertically downwards through a reaction vessel, such as a tubular vessel and the products of reaction collected in the lower part of the reactor or in a chamber which is in communication with the lower part of the reactor.

The zone of the reactor into which the reactant streams are fed becomes a zone of turbulence and leads to improved contact between the reactants. The cross-sectional area of the reactor, at least in the zone into which the reactants are fed, is preferably such that the turbulence created by the entry of the reactants is, under the conditions of concentration and throughput employed, such as to result in intimate contact between the reactants.

The turbulence, particularly when the amine is introduced into the reactor in vapour form, may be created by or enhanced by a fan. The bringing together of the two diluted reactants in vapour form in a zone of turbulence mitigates local overheating.

The reaction is exothermic and the reaction temperature is preferably regulated mainly by controlling the concentration of the reactants and their rate of throughput.

The crude product of the reaction of the amine with sulphur trioxide consists largely of the amine salt, for example cyclohexylammonium N-cyclohexyl sulphamate, and the invention also provides a process of separating the amine salt from the crude reaction product. Such process comprises extracting, preferably at an elevated temperature, an aqueous solution of the reaction product with an aromatic solvent immiscible with water, and subsequently crystallising the cyclohexylammonium N-cyclohexyl sulphamate from the aqueous phase.

The temperature at which the extraction is carried out must not be so high that the solvent is vaporised, but must be high enough to dissolve the crude product in the amount of water used, this preferably being low so that only a small amount of the amine salt is left in solution and lost during crystallisation.

A number of aromatic solvents are suitable particularly aromatic hydrocarbons, toluene being a good example since it can be used at about 90° C. and is a fairly good solvent for the dialkyl or dicyclohexyl sulphonamide (e.g. N,N'-dicyclohexyl sulphonamide $C_6H_{11} \cdot NH \cdot SO_2 \cdot NH \cdot C_6H_{11}$) which is one of the main impurities. Large amounts of solvent are preferably avoided. The volumes of aromatic solvent and aqueous solution may, for example, be in a ratio of 1:4.

The crystallisation is preferably carried out by simply allowing the solution to fall to normal ambient temperature, since strong cooling may result in the precipitation of sulphates. The crystallised amine salt obtained is preferably freed from sulphates by being washed with water after separation from the mother liquor.

To obtain the sulphamate as a metal salt, the form usually required, the washed product is treated with a base, for example caustic soda, the freed amine being removed, advantageously by distilling the solution.

Preferably the solution is then again extracted to remove, in particular, traces of dialkyl or dicycloalkyl sulphonamide still remaining. A good solvent for the dialkyl or dicycloalkyl sulphonamide should be selected, preferably an aliphatic chlorohydrocarbon, a suitable example being ethylene dichloride.

A suitable concentration of caustic soda is for example 5%, though the concentration is not critical and solutions up to 20% or more may be used. The amount of the solution used is preferably such that the metal salt of the N-substituted sulphamic acid crystallises out on cooling leaving only a small amount behind in solution.

A preferred manner of purifying the crude product of the reaction of the amine with sulphur trioxide, which crude product comprises a mixture of alkylammonium N-alkyl sulphamate and N,N'-dialkyl sulphonamide (where alkyl refers to primary or secondary alkyl or cycloalkyl), comprises heating the mixture under pressure with an aqueous metal hydroxide solution, suitably aqueous alkali metal hydroxide solution, at an elevated temperature, preferably 120° to 200° C., in an atmosphere inert to the reactants and products, suitably nitrogen, hydrogen, or a rare gas, to convert both the said organic reactants (i.e. the sulphamate and the sulphonamide) into the corresponding metal salt of N-alkyl sulphamic acid. The product is a clear solution free of an objectionable degree of colour, from which the metal salt of N-alkyl sulphamic acid may be crystallised in high purity, preferably after removal of the amine by distillation.

The inert gas used is preferably nitrogen, but may be any gas which does not react with the reactants and is not excessively soluble in water. It need not be added to the mixture at a high pressure since the autogenous pressure resulting from heating the aqueous mixture is sufficient.

The invention also provides apparatus for carrying out the reaction between the amine and the sulphur trioxide, the apparatus comprising an upright reactor, suitably a tubular reactor, having one or more inlets for reactants in its upper part, an outlet for reaction product in its lower part and means for removing solid reaction product from the wall of the reactor.

The inlet for the reactants advantageously comprises two concentric nozzles or tubes. Alternatively, one or more inlets may be provided for one reactant whilst a plurality of inlets are provided for the second reactant, said plurality of inlets being spaced from the other inlet or inlets in such manner that when the second reactant is fed into the reactor it forms a stream which substantially completely surrounds the stream of the other reactant.

One preferred construction of the means for removing solid reaction product from the reactor wall comprises a scraper adapted to be reciprocated axially of the tubular reactor. The scraper advantageously comprises a plurality of individual, interconnected scrapers disposed in spaced relationship and bearing on the wall of the reactor. Each individual scraper may be, for example, in the form of an annulus so that solid material removed from the wall of the reactor and the reaction mixture may flow downwardly through the reactor through the space in the central part of each annular scraper.

Another construction of such means for removing solid reaction product from the wall of the tubular reactor includes a rotor comprising one or more blades disposed axially of the reactor and which are adapted to wipe the wall of the reactor. The blades may be spaced from and connected by cross-bars or rods to a rotary shaft disposed axially of the reactor. Means to drive the rotary shaft, for example a pulley or like member, are provided at the head of the reactor and the lower end of the shaft is mounted in a bearing in the lower part of the reactor. Alternatively, the bearing at the lower end of the rotary shaft may be omitted to provide a free-swinging rotary shaft.

The apparatus may be provided with means for cooling the reaction mixture. Such means may be disposed internally or externally of the tubular reactor.

Several forms of apparatus suitable for carrying out the process according to the invention are diagramatically illustrated by way of example in the accompanying drawings in which FIGURE 1 is a vertical section of one construction;

FIGURE 2 is a cut-away view of another construction, the cut-away portion being shown in vertical section;

FIGURE 3 is a vertical section of a further construction;

FIGURE 4 is a vertical section of another construction, and

FIGURE 5 is a vertical section of yet a further construction.

The apparatus shown in FIGURE 1 comprises a tubular reactor 1 provided with a jacket 2 having an inlet 3 and outlet 4 for a heat transfer medium. The reactor 1 is provided at its upper end with a cover plate 5 in which an inlet 6 for the reactants is centrally disposed. The inlet 6 comprises a spray nozzle 7 and a surrounding cylindrical member 8 coaxial with the nozzle 7. The nozzle 7 is provided with two feed lines 9 and 10, line 9 for a liquid feed, for example cyclohexylamine, and line 10 for a gaseous diluent, such as nitrogen or air, to assist in atomising the liquid feed. The cylindrical member is provided with a feed line 11 for a gaseous reactant.

A mechanism 12 comprising several annular scrapers 13 interconnected by rods 14 and 15, is disposed within the reactor 1, the outer diameter of the scrapers 13 being substantially the same as the internal diameter of the reactor. The rod 14 extends through a gland in the cover plate 5 and is connected to a shoe 16 adapted to slide in guides 17. One end of the rod 18 is pivotally connected to the shoe 16, the other end of the rod 18 being pivotally and eccentrically mounted on a driving wheel 19. Rotation of the driving wheel 19 reciprocates the scraping mechanism 12 axially of the reactor 1 and serves to remove any solid reaction product from the wall of the reactor. The solid reaction product falls through the central part of the annular scrapers 13 and leaves the reactor at its base. A thermocouple 20 serves to measure the reaction temperature.

The construction shown in FIGURE 2 comprises a tubular reactor 21 having a jacket 22 provided with an inlet 23 and an outlet 24 for a cooling medium. Two reactant inlets are provided in the upper part of the reactor, one inlet 25 being for a spray of, for example cyclohexylamine admixed with an inert gaseous diluent and the other inlet 26 for a gaseous reactant, for example, sulphur trioxide. A thermocouple (not shown) for measuring the reaction temperature is disposed in a recess in the reactor wall at a level just below the level of the inlet 26.

A rotatable shaft 27 is mounted axially within the reactor 21. The upper end of the shaft 27 extends through the cover plate 28 of the reactor and a driving pulley 29 is keyed on the upper end of the shaft. The lower end of the shaft 27 is mounted in bearings 30 supported by a spider 31. Blades 32 are secured by rods 33 to the shaft 27 to extend longitudinally of the reactor. The outer edge of each blade 32 is substantially in contact with the wall of the reactor so that, upon rotation of the shaft 27, the blades wipe the wall of the reactor and remove solid reaction product therefrom, the solid falling down through the reactor to emerge from an outlet 34 into a collecting vessel (not shown).

The blades 32 not only clean the wall of the reactor but also create turbulence in the reactor and thereby assist the transfer of heat to the reactor wall.

The apparatus shown in FIGURE 3 comprises a reactor 43 the lower part of which communicates with two large vessels or "haybarns" 47 and 48 each provided with a product receiver 49 and 50 respectively. The two vessels 47 and 48 are separated by overlapping, perforated baffles 56 and 57 and the vessel is provided with a gas outlet 58 having a perforated member 59 at its inner end.

At its upper end, the reactor 43 is provided with an inlet tube 41 which is surrounded by a coaxial tube 42 through which a gas may be passed from line 52 into the reactor 43. The outlet ends of the tubes 41 and 42 are surrounded by a coaxial tube 44 through which a second reactant is fed into the reactor 43 from a feed line 54.

The liquid amine is preferably fed through the tube 41 into the upper part of a vertical vessel 43, amine issuing in the form of a fine spray. The jet spray of liquid amine issues into a stream of sulphur trioxide vapour diluted with an inert gas, for example nitrogen, the diluted sulphur trioxide vapour being fed into the vessel 43 through the outer tube 44. Intimate contact between the reactants thus occurs. The rates at which the amine and sulphur trioxide are fed into the vessel 43 is preferably such that the temperature in the upper zone of the vessel 43 in which the reactants contact each other and react, rises to a level within the range 150–200° C. A thermocouple 45 may be provided to measure the temperature in such zone. The products of reaction are collected in the receivers 49 and 50. The apparatus illustrated in FIGURE 4 comprises a vertical column or reactor 61 free from packing, baffles and other solid obstructions. The reactor is provided in its upper part with two spaced inlet lines 62 and 63 through the outlet nozzles of which two streams of sulphur trioxide vapour diluted with an inert gas, for example nitrogen, may be fed downwardly into the reactor. An inlet line 64 opens into the reactor 61 at a position between the nozzles of the lines 62 and 63, and the outlet end of the line 64 is surrounded by a coaxial tube 69 through which a stream of inert gas may be fed into the reactor from a line 65. The reactor 61 is provided with a product receiver 66 and an outlet line 67 for vapours, the line 67 communicating with a cyclone (not shown) for separating the remainder of the reaction product.

The apparatus shown in FIGURE 5 comprises a reactor 71 in the upper part of which are provided two jets or nozzles 72 and 73 through which the amine and sulphur trioxide vapours are introduced. The nozzles 72 and 73 are so disposed that the two streams of vapour passed through them converge one on the other. A fan 74 is disposed in such position in the reactor as to enable it, in operation, to create a zone of turbulent air at the position where the two vapour streams meet. A thermocouple 76 is also provided in the zone where the vapour streams meet. The lower end of the reactor 71 is in communication with two large vessels or "haybarns" 77 and 78 each of which is provided with a product receiver 79 and 80 respectively, the vessel 78 being also provided with an outlet 81 for gas.

The process according to the invention is illustrated in the following examples.

Example 1

This example was carried out in the apparatus illustrated in FIGURE 1 which, however, was not provided with the jacket 2.

Cyclohexylamine was fed through line 9 at the rate of 20.2 grams per minute and air was fed in through line 10 at the rate of 18.2 litres per minute so that the cyclohexylamine, atomised by the air, emerged from the nozzle 7 as a spray. 7.94 grams of sulphur trioxide vapour admixed with 25 litres of air were fed per minute through line 11, so providing a molar ratio of amine to sulphur trioxide of 2.06:1. The diluted sulphur trioxide thus entered the reactor as a concentric stream around the jet of atomised cyclohexylamine. Both streams of reactants were preheated and fed into the reactor at 100°C. The scraper mechanism 12 was driven by the driving wheel 19 and the up and down motion of the scrapers 13 kept the wall of the reactor clean. A reaction temperature of 175–180°C. was rapidly attained.

After one hour's operation, 1,688 grams of reaction product was collected in a vessel disposed below the reactor. The reaction product included 1,360 grams of cyclohexylammonium N-cyclohexyl sulphamate, 262 grams of cyclohexylammonium sulphate and 59 grams of N,N'-dicyclohexyl sulphonamide ($C_6H_{11}.NH.SO_2.NH.C_6H_{11}$).

The colour values of a 4.5% w./v. solution of this crude reaction product in aqueous sodium hydroxide measured in a 2" cell on a Lovibond tintometer, were Red _____ 0.2
Yellow _____ 0.8
Blue _____ —

The colour values were measured only after all matter insoluble in the aqueous sodium hydroxide had settled.

A kilogram of the crude reaction product so obtained was added to a mixture of 1.5 litres of water and 400 ml. of toluene, and the mixture was heated and stirred until a temperature of 90° C. was reached. The stirring was then discontinued and the aqueous and organic layers were allowed to separate, the temperature of the system being maintained between 80° C. and 90° C. In this way most of the dicyclohexyl sulphonamide impurity was extracted into the organic layer. The aqueous layer was allowed to cool and crystallise. The crystals were centrifuged out and washed on the centrifuge with 1 litre of water. In this way 684 grams of cyclohexylammonium N-cyclohexyl sulphamate free of sulphate ions were obtained.

278 grams of the purified cyclohexylammonium N-cyclohexyl sulphamate were refluxed in a solution containing 40 grams of sodium hydroxide in 850 ml. of water. After a short reflux period, 550 grams of distillate containing cyclohexylamine were removed. The resulting solution of sodium N-cyclohexyl sulphamate was extracted at 60° C. with ethylene dichloride to remove the last traces of dicyclohexyl sulphonamide. The solution was then decolourised with activated charcoal, concentrated and crystallised to yield 171 grams of sodium N-cyclohexyl sulphamate.

Example 2

This example illustrates the adverse effect on the colour of the reaction product when the molar ratio of cyclohexylamine to sulphur trioxide is changed from 3:1 to 4:1. The example was carried out in the apparatus illustrated in FIGURE 1 but without the jacket 2.

Three runs were carried out substantially as described in Example 1 except that (i) only the sulphur trioxide stream was preheated to 100° C., the cyclohexylamine being fed in at ambient temperature (20° C.) and (ii) the molar ratio of cyclohexylamine to sulphur trioxide was different whilst the concentration of total reactants in each of the three runs was maintained the same as in Example 1, the concentration being for this purpose expressed as grams-mols per hour of total reactants divided by litres per minute of total carrier or diluent gases.

The colour values of the crude reaction products were determined both as 4.5% w./v. solutions in water and as 4.5% w./v. solutions in aqueous sodium hydroxide, the values being measured in each case in a 2″ cell of a Lovibond tintometer. The colour values were measured after all insoluble matter, which consisted substantially of N,N'-dicyclohexyl sulphonamide, had settled. The results obtained are shown in the following Table 1.

TABLE 1

| Run | Molar ratio of cyclo-hexylamine to sulphur trioxide | Color values measured in a 2″ cell on a Lovibond tintometer | | | | | |
|---|---|---|---|---|---|---|---|
| | | 4.5% w./v. solution in water | | | 4.5% w./v. solution in aqueous sodium hydroxide | | |
| | | R | Y | B | R | Y | B |
| 1 | 2:1 | 0.2 | 0.8 | ------ | 0.1 | 1.0 | ------ |
| 2 | 3:1 | 0.3 | 1.0 | ------ | 0.1 | 1.2 | ------ |
| 3 | 4:1 | 1.0 | 3.4 | 0.1 | 3.6 | 3.0 | 0.1 |

(R = red, Y = yellow, B = blue).

The marked increase in the colour values of the crude reaction product when the molar ratio of the reactants was 4:1 (run 3) is clearly evident from Table 1. The reaction temperatures during runs 1, 2 and 3 were, respectively, 170–180° C., 130–135° C. and 105° C. Although the temperatures were different in the three runs, it has nevertheless been noticed that the use of lower reaction temperatures, for example temperatures below 190° C., does not tend to lead to deterioration in the colour of the reaction product but, if anything to an improvement in the colour of the product.

Example 3

The initial reaction step of Example 1 was repeated but with the total concentration of the reactants halved whilst maintaining the total volume of carrier or diluent gas, the molar ratio of cyclohexylamine to sulphur trioxide being the same as in Example 1. The reaction temperature decreased to 100° C. and the amount of cyclohexylammonium N-cyclohexyl sulphamate in the product was 65% as against 81% in Example 1. The colour values of the crude reaction product determined as in Example 1, were:

Red _____ 0.1
Yellow _____ 0.7
Blue _____ —

Example 4

The initial reaction step of Example 1 was repeated but in this case the reactor was provided with the jacket 2. Water was passed through the jacket 2, the reaction temperature being thereby reduced to 140° C. The amount of cyclohexylammonium N-cyclohexyl sulphamate in the product was 73%. The colour values of the crude reaction product, determined as in Example 1 were:

Red _____ 0.1
Yellow _____ 0.7
Blue _____ —

Example 5

The initial reaction step of Example 1 was repeated except that the cyclohexylamine feed rate was decreased to give a molar ratio of cyclohexylamine to sulphur trioxide of 1.6:1 instead of approximately 2:1. The reaction temperature dropped to 130° C. and the amount of cyclohexylammonium N-cyclohexyl sulphamate in the product was 63%.

The colour values of the crude reaction product determined as in Example 1, were:

Red _____ 0.1
Yellow _____ 0.8
Blue _____ —

Example 6

This example was carried out in the apparatus shown in FIGURE 2 with cooling water passing through the jacket 22.

A spray of finely divided cyclohexylamine admixed with air was fed into the reactor 21 through the inlet 25 at the rate, per minute, of 20.2 grams of cyclohexylamine and 18.2 litres of air. 7.94 grams of sulphur trioxide vapour diluted with 25 litres of air were fed per minute through the inlet 26. The molar ratio and the concentration of the reactants and the throughput rate were thus the same as in Example 1. The two reactant streams were preheated to 100° C. before feeding into the reactor. The shaft 27 was rotated at high speed and the blades 32 maintained the reactor wall clean. The turbulence created by the blades 32 brought about efficient mixing of the reactants and prevented the occurrence of "hot spots." A reaction temperature of 175–180° C. was rapidly attained.

1600 grams of crude reaction product was obtained in one hour, 80 wt. percent of which was cyclohexylammonium N-cyclohexyl sulphamate. The colour values of this crude reaction product were measured in the manner described in Example 1 and were found to be:

Red _____ 0.2
Yellow _____ 0.8
Blue _____ —

The cyclohexylammonium N-cyclohexyl sulphamate was separated from the crude reaction product as described in Example 1.

278 grams of the cyclohexylammonium N-cyclohexyl sulphamate were refluxed for one hour in 750 ml. of water containing 40 g. of sodium hydroxide. The solution was cooled to 60° C. and extracted with 200 ml. of benzene, followed by two further benzene extractions, each of 100 ml. Hydrolysis was completed by refluxing and removal of the remaining cyclohexylamine. The resulting solution was decolourised with activated charcoal, filtered and allowed to crystallise. 137 grams of sodium N-cyclohexyl sulphamate (sodium cyclamate) were obtained. The mother liquor was then concentrated to yield a further 34 grams.

Example 7

This example was carried out in the apparatus which is diagrammatically illustrated in FIGURE 3 of the accompanying drawings. Liquid cyclohexylamine was fed into vessel 43 through the tube 41 at a rate of 15.7 grams per minute, the cyclohexylamine being atomised as it issued from the tube 41 by means of nitrogen fed in through the tube 42 at a rate of 12 litres per minute. Sulphur trioxide vapour diluted with air was fed into the vessel 43 through the annulus between the tubes 42 and 44 at a rate of 5.83 grams of sulphur trioxide and 16.5 litres of air per minute, the diluent air being dry and free from carbon dioxide. The reaction temperature in the upper part of the vessel 43 was maintained at 185° C. and after one hour of operation 1,220 grams of product were obtained. The colour values of this product were measured as in Example 1 and were found to be:

Red _____ 0.2
Yellow _____ 0.8
Blue _____ —

By crystallisation and filtration the following products were isolated:

| | Grams |
|---|---|
| Cyclohexylammonium-N-cyclohexyl sulphamate | 903 |
| Cyclohexyl ammonium sulphate | 220 |
| N,N'-dicyclohexyl sulphonamide | 79 |

834 grams of the cyclohexylammonium N-cyclohexyl sulphamate so obtained were boiled with a solution of 123 grams of sodium hydroxide in 3 litres of water. Evaporation and crystallisation of the resulting solution yielded 544 grams of sodium N-cyclohexyl sulphamate.

Example 8

Sulphur trioxide and cyclohexylamine were reacted in the apparatus which is diagrammatically illustrated in FIGURE 4 of the accompanying drawings. Two streams of sulphur trioxide vapour in nitrogen were fed downwardly into the upper part of the reactor 61 through the spaced nozzles of the two inlet lines 62 and 63. Liquid cyclohexylamine was fed through the line 64 into the reactor at a position between the two nozzles 62 and 63, and a stream of nitrogen was directed from the line 65 over the outlet of the line 64 whereby the cyclohexylamine emerged from line 64 into the reactor as a spray of fine droplets. The cyclohexylamine was fed in at a rate of 3.65 grams per minute and the sulphur trioxide at a rate of 1.48 grams per minute, the molar ratio of cyclohexylamine to sulphur trioxide being thus 2:1. The reaction temperature was 170–180° C.

Reaction products were collected in the receiver 66 provided at the bottom of the reactor whilst exit vapours passed through the line 67 into a cyclone in which the remainder of the reaction product was separated. After 2 hours of operation, 612 grams of product were collected. The colour values of the product, measured as in Example 1 were:

Red _____ 0.2
Yellow _____ 0.7
Blue _____ —

By crystallisation and filtration, the reaction product was separated into 490 grams of cyclohexylammonium N-cyclohexyl sulphamate (a yield of 80%), 24.6 grams of N,N'-dicyclohexyl sulphonamide and 97.4 grams of cyclohexylammonium sulphate.

The cyclohexylammonium N-cyclohexyl sulphamate (490 grams) was boiled with a solution of 70 grams of sodium hydroxide in 1 litre of water. Evaporation and crystallisation of the resulting solution gave 320 grams of sodium N-cyclohexyl sulphamate.

Example 9

Example 8 was repeated except that the nitrogen used as a diluent for the sulphur trioxide vapour was replaced by dry air free from carbon dioxide as was the nitrogen used to atomise the liquid cyclohexylamine. The yield obtained was substantially the same as that obtained in Example 8. The colour values of the crude reaction product, measured as in Example 1, were:

Red _____ 0.2
Yellow _____ 0.8
Blue _____ —

Example 10

This example was carried out in the apparatus illustrated in FIGURE 1 which, however, was not provided with the jacket 2.

Cyclohexylamine was fed through line 9 at a rate of 6,900 grams per hour and nitrogen was fed through line 10 at a rate of 9,480 litres per hour, so that the cyclohexylamine, atomised by the nitrogen, emerged from the nozzle 7 as a spray. 2,750 grams of sulphur trioxide vapour admixed with 4,200 litres of air were fed per hour through the line 11. The diluted sulphur trioxide thus entered the reactor as a concentric stream around the jet of atomised cyclohexylamine. The stream of sulphur trioxide was preheated and fed into the reactor at 100° C. whilst the stream of cyclohexylamine was fed in at ambient temperature (20° C.). The scraper mechanism 12 was driven by the driving wheel 19 and the up and down motion of the scrapers 13 kept the reaction wall clean. A reaction temperature of 170–175° C. was rapidly attained.

After 2 hours' operation, 18,000 grams of reaction product were collected. The colour values of the reaction product were determined as in Example 1 and were found to be:

Red _____ 0.2
Yellow _____ 0.8
Blue _____ —

The reaction product was found to contain 13,840 grams of cyclohexylammonium N-cyclohexyl sulphamate.

Example 11

This example shows the effect on reaction temperature, and the consequent effect on the yield of cyclohexylammonium N-cyclohexyl sulphamate (C.A.C.), of the concentration of the reactants and the rate of throughput of the reactants (Table 2). The effect of external cooling of the reactor is shown in Table 3.

TABLE 2.—EFFECT OF CONCENTRATION AND THROUGHPUT

| Run | Concentration | Temperature, ° C. | Throughput [2] gram/mols $SO_3$ per hour | Percent C.A.C. | Percent C.A.S. | Ratio of C.A.C. to C.A.S. |
|---|---|---|---|---|---|---|
| 4 | 0.23 | 100 | 14.9 | 65 | 46 | 1.4:1 |
| 5 | 0.31 | 125 | 19.7 | 68 | 47 | 1.4:1 |
| 6 | 0.39 | 145 | 25 | 73 | 35 | 2:1 |
| 7 | 0.47 | 175 | 30 | 77 | 21 | 3.7:1 |
| 8 | 0.47 | 182 | 38.5 | 83 | 14 | 6:1 |

See footnotes bottom of Table. 3.

TABLE 3.—EFFECT OF EXTERNAL COOLING

| Run | Concentration | Temperature, °C. | Throughput [2] gram/ mols SO[3] per hour | Percent C.A.C. | Percent C.A.S. | Ratio of C.A.C. to C.A.S. |
|---|---|---|---|---|---|---|
| 9 | 0.53 | 158 | 34 | 72.6 | 34.4 | 2:1 |
| 10 | 0.54 | 173–176 | 34.6 | 84 | 13 | 6.5:1 |

[1] The concentration in Tables 2 and 3 is expressed as the quotient obtained upon dividing grammols/hour of total reactants by litres/minute of total diluent or carrier gases.
[2] Throughput. This is expressed in Tables 2 and 3 as given in the headings, namely as the number of gram-mols of sulphur trioxide fed in per hour. In each of runs 4 to 10, 2 mols of cyclohexylamine were employed per mol of sulphur trioxide so that the total throughput of both reactants may be readily calculated.

Runs 4 to 10 were carried out in the apparatus shown in FIGURE 1 and in much the same as in Example 1 except that only the sulphur trioxide stream was preheated to 100° C., the cyclohexylamine stream being fed in at ambient temperature (20° C.). Runs 4 to 8 and 10 were carried out without the use of jacket 2 that is without cooling, whilst during run 9 the apparatus was cooled by passing water through the jacket 2. It will be seen from Table 2 that as the concentration of the reactants and/or their throughput was increased from run 4 to run 8, the reaction temperature increased as did the proportion of cyclohexylammonium N-cyclohexyl sulphamate (C.A.C.) in the product, the proportion of cyclohexylammonium sulphate (C.A.S.) in the product progressively decreasing over the same runs. Further it will be noted that the same concentration was used in runs 7 and 8 but that a higher throughput rate was employed in run 8 with a consequent higher reaction temperature and a higher proportion of the desired compound in the reaction product.

In runs 9 and 10, substantially the same concentration of the reactants were put through at substantially the same rate in both runs. The external cooling carried out in run 9 resulted in a lower reaction temperature and a lower yield of cyclohexylammonium N-cyclohexyl sulphamate.

The yields of C.A.C. and C.A.S. given in Tables 2 and 3 were determined upon analysis of the reaction product after it had been treated with water and it will be seen that the sum of the yields exceeds 100 % in some of the runs.

It appears possible that upon incomplete reaction, some of the unreacted cyclohexylamine and sulphur trioxide is adsorbed or otherwise retained in the reaction product, and that when water is mixed with the reaction product, any sulphur trioxide retained is converted to sulphuric acid which is neutralised by retained cyclohexylamine thereby forming C.A.S. This appears to be the explanation for the sum of the figures for C.A.C. and C.A.S. which exceeds 100%, that is, the totals over 100 % probably result from an increase in molecular weight which may occur when the reaction product is added to water and sulphur trioxide retained in the reaction product is converted to sulphuric acid.

Example 12

Sulphur trioxide vapour and liquid isobutylamine were reacted in the apparatus shown in FIGURE 4 of the accompanying drawings. The liquid isobutylmine was fed in through line 64 and atomised into a fine mist by a stream of nitrogen fed in through line 65. Two streams of sulphur trioxide vapour diluted with nitrogen were fed in through the nozzles 62 and 63. The feed rates of the two reactants were 2.70 grams per minute of isobutylamine and 1.48 grams per minute of sulphur trioxide, the molar ratio of amine to sulphur trioxide being thus 2:1. The reaction temperature was 170°–180° C.

The total reaction product, including that separated from the exit vapours in the cyclone, collected in 2 hours was 490 grams. By crystallisation and filtration the product was separated into 400 grams of isobutylammonium N-isobutyl sulphamate, 50 grams of di-isobutyl sulphonamide and 40 grams of isobutylammonium sulphate. The colour values of the crude reaction product measured as in Example 1, were Red --------------------------------------------- 0.2
Yellow ------------------------------------------ 0.8
Blue -------------------------------------------- —

The 400 grams of isobutylammonium N-isobutyl sulphamate were boiled with a solution of 71 grams of sodium hydroxide in 500 mls. of water. Upon evaporation and crystallisation of the resulting solution, 245 grams of sodium N-isobutyl sulphamate were obtained.

Example 13

Sulphur trioxide and cyclohexylamine, both in vapour form, were reacted in the apparatus which is diagrammatically illustrated in FIGURE 5.

A stream of sulphur trioxide vapour in nitrogen at 100° C. was introduced through the nozzle 72 and a stream of cyclohexylamine vapour in nitrogen at 100° C. was introduced through the nozzle 73 into the zone of turbulent air created by the fan 74. The rate of feed of the sulphur trioxide was about 1.7 grams in a litre of nitrogen per minute whilst the cyclohexylamine was fed in at the rate of about 4.21 grams in 3 litres of nitrogen per minute, the molar ratio of cyclohexylamine:sulphur trioxide being 2:1. The reaction temperature was 170–180° C. The turbulent stream then passed through the reactor 71 into the vessels 77 and 78 and the reaction product was collected in the receivers 79 and 80.

After one hour's operation, 306 grams of a solid product were collected. By crystallisation and filtration, 245 grams of cyclohexylammonium N-cyclohexyl sulfamate (a yield of 69%), 12.3 grams of N,N'-dicyclohexyl sulphonamide and 48.7 grams of cyclohexylammonium sulphate were obtained from the solid product.

Example 14

A stream of sulphur trioxide vapour in nitrogen and a stream of cyclohexylamine vapour were contacted with each other as described in Example 13. The rate of feed of the sulphur trioxide was about 1.48 grams in a litre of nitrogen per minute whilst the cyclohexylamine was fed in at the rate of about 3.65 grams in 3 litres of nitrogen per minute, the molar ratio of cyclohexylamine: sulphur trioxide being 2:1. Both the sulphur trioxide/ nitrogen stream and the cyclohexylamine/nitrogen stream were introduced into the reactor at a temperature of 100° C. The reaction temperature was 170–180° C. The turbulent stream of reactants then passed into the large vessels 77 and 78 and the reaction product was collected in receivers 79 and 80.

After one hour's operation, 306 grams of a solid product were collected. By crystallisation and filtration, 245 grams of cyclohexylammonium N-cyclohexyl sulphamate (a yield of 80%), 12.3 grams of N,N'-dicyclohexyl sulphonamide and 48.7 grams of cyclohexylammonium sulphate were obtained from the solid product.

The cyclohexylammonium N-cyclohexyl sulphamate (245 grams) was boiled with a solution of 35.2 grams of sodium hydroxide in 400 mls. of water. Evaporation and crystallisation of the resulting solution gave 160 grams of sodium N-cyclohexyl sulphamate.

Example 15

A stream of sulphur trioxide vapour in nitrogen and a stream of isoamylamine vapour in nitrogen, both at 100° C., were introduced into the reactor employed in Example 13 through the nozzles 72 and 73 respectively into the zone of turbulent air created by the fan 74. The rate of feed of the sulphur trioxide was about 1.48 grams in a litre of nitrogen per minute whilst the isoamylamine was fed in at the rate of about 3.2 grams in 3 litres of nitrogen per minute, the molar ratio of isoamylamine:sulphur trioxide being 2:1. The reaction temperature was 170–180° C. The turbulent stream of reactants then passed into the large vessels 77 and 78 and the reaction product was collected in receivers 79 and 80.

After one hour's operation, 260 grams of a solid product were collected. By crystallisation and filtration, 245 grams of isoamylammonium N-isoamyl sulphamate, 4 grams of N,N'-di-isoamyl sulphonamide and 11 grams of isoamylammonium sulphate were obtained from the solid product.

The isoamylammonium N-isoamyl sulphamate (245 grams) was boiled with a solution of 38.5 grams of sodium hydroxide in 500 mls. of water. Evaporation and crystallisation of the resulting solution gave 150 grams of sodium N-isoamyl sulphamate.

Example 16

This example was carried out in the apparatus used in Example 13 and illustrates the adverse effect on product colour when the molar ratio of amine to sulphur trioxide is above 3:1. Three runs were carried out substantially as described in Example 13 except that the concentrations of sulphur trioxide and cyclohexylamine were as shown in Table 4.

TABLE 4

| Molar Ratio Cyclohexylamine:SO₃ | Feed Rates | |
| --- | --- | --- |
| | Cyclohexlyamine | SO₃ |
| 2:1 | 4.2 gms. in 3 litres of nitrogen per minute. | 1.7 gms. in 1 litre of nitrogen per minute. |
| 3.1 | 4.2 gms. in e litres of nitrogen per minute. | 1.1 gms. in 0.5 litre of nitrogen per minute. |
| 4:1 | 4.2 gms. in 3 litres of nitrogen per minute | 0.85 gm. in 0.3 litre of nitrogen per minute. |

The colour values of the crude reaction products were determined both as 4.5% w./v. solutions in water and as 4.5% w./v. solutions in aqueous sodium hydroxide, the values being measured in each case in a 2″ cell on a Lovibond tintometer. The colour values were measured after all insoluble matter, which consisted substantially of N,N'-dicyclohexyl sulphonamide, had settled. The results obtained are shown in Table 5.

TABLE 5

| Run | Molar Ratio of Cyclohexylamine to SO₃ | Colour values measured in a 2″ cell on a Lovibond tintometer | | | | | |
| --- | --- | --- | --- | --- | --- | --- | --- |
| | | 4.5% w./v. solution in water | | | 4.5% w./v. solution in aqueous sodium hydroxide | | |
| | | R | Y | B | R | Y | B |
| 1 | 2:1 | 0.2 | 0.8 | ------ | 0.1 | 1.0 | ------ |
| 2 | 3:1 | 0.3 | 1.0 | ------ | 0.1 | 1.2 | ------ |
| 3 | 4:1 | 1.0 | 3.4 | 0.1 | 3.6 | 3.0 | 0.1 |

(R=red; Y=yellow; B=blue).

The market increase in the colour values of the crude reaction product when the molar ratio of the reactants was 4:1 (run 3) is clearly evident from Table 5. The reaction temperatures during runs 1, 2 and 3 were, respectively, 170–180° C., 130–135° C. and 105° C. Although the temperatures were different in the three runs, it has nevertheless been noticed that the use of lower reaction temperatures, for example temperatures below 190° C., does not tend to lead to deterioration in the colour of the reaction product but, if anything, to an improvement in the colour of the product.

EXAMPLE 17

This example illustrates the effect of reduced reaction temperature. The apparatus described in Example 13 was slightly modified in that a cooling liquid jacket was fitted to reactor 81. The rate at which cooling liquid could be passed through the jacket was variable and thus a means of controlling reaction temperature was provided. The experiment described in Example 13 was then repeated with the reaction temperature controlled at 45° C., 100° C., 140° C. and 180° C. and the results obtained are given in Table 6.

TABLE 6

| Reaction temperature | Analysis of Reaction Product | | |
| --- | --- | --- | --- |
| | Percent N,N'-di-cyclohexyl sulphonamide | Percent cyclohexylammonium N-cyclohexyl sulphamate | Percent cyclohexylammonium sulphate |
| 45° C | 3 | 45 | 53 |
| 100° C | 2 | 52 | 49 |
| 140° C | 3 | 55 | 46 |
| 180° C | 3 | 70 | 25 |

153 gms. of the reaction product obtained from the experiment at 180° C. were mixed with 26 gms. of sodium hydroxide dissolved in 700 ccs. of water and the mixture boiled to remove cyclohexylamine. When the cyclohexylamine had been distilled off the aqueous distillation residue was extracted five times with 1,1,2-trichlorethane to remove N,N'-dicyclohexyl sulphonamide. The purified aqueous solution containing 77 gms. of sodium N-cyclohexyl sulphamate was then adjusted in concentration until the sodium N-cyclohexyl sulphamate concentration was 35% w./w. and allowed to crystallize. After filtration and drying 50 gms. of pure sodium N-cyclohexyl sulphamate were obtained.

A second crop of 16 gms. was obtained by reconcentrating the mother liquor from the first crystallization and allowing the concentrated liquor to crystallize.

EXAMPLE 18

278 gms. of crude reaction product produced by the sulphonation of cyclohexylamine according to the process of the invention and containing mainly cyclohexylammonium N-cyclohexyl sulphamate plus cyclohexylammonium sulphate and N,N'-dicyclohexyl sulphonamide were heated in a stirred autoclave with 50 gms. of sodium hydroxide dissolved in 400 mls. of water. After heating for 4 hours at 180° C., the autoclave contents were allowed to cool and a clear but coloured solution was discharged from the autoclave. The colour of the solution, measured in a 2″ cell on a Lovibond tintometer was as follows:

Red _____ 2.2
Yellow _____ 4.0
Blue _____ 0.8

The reaction was repeated with the exception that the air above the liquid in the autoclave was carefully displaced by nitrogen prior to the autoclave contents being heated.

The resulting solution, following the heating and cooling periods, had a considerably improved colour measured as:

Red _____ 0.3
Yellow _____ 0.9
Blue _____ --

This example clearly shows the improved colour which results from carrying out the pressure hydrolysis in an inert atmosphere.

EXAMPLE 19

153 gms. of a crude product obtained by the process according to the invention and containing, by weight, 70% cyclohexylammonium N-cyclohexyl sulphamate, 3% N,N'-dicyclohexyl sulphonamide and 25% cyclohexylammonium sulphate, were mixed with 27 gms. of sodium hydroxide dissolved in 294 gms. of water and the mixture placed in an autoclave which was then purged with nitrogen. After complete purging nitrogen was admitted until a pressure of 50 p.s.i. was reached. The autoclave contents were stirred and heated to 150° C. for 5 hours. During this time the N,N'-dicyclohexyl sulphonamide was hydrolysed to sodium N-cyclohexyl sulphamate and cyclohexylamine whilst sodium N-cyclohexyl sulphamate was produced from cyclohexylammonium N-cyclohexyl sulphamate.

The contents of the autoclave were then cooled, discharged and analysed for sodium N-cyclohexyl sulphamate, sodium sulphate and N,N'-dicyclohexyl sulphonamide. The N,N'-dicyclohexyl sulphonamide had been completely hydrolysed to give cyclohexylamine and sodium N-cyclohexyl sulphamate, whilst the autoclave contents contained 80 gm. of sodium N-cyclohexyl sulphamate. There was no change in the colour value after hydrolysis.

We claim:

1. In a process for the production of cycloalkylammonium N-cycloalkyl sulphamate or alkylammonium N-alkyl sulphamate by reacting sulphur trioxide with monocyclohexylamine or mono-isoalkylamines containing not more the 8 carbon atoms in the molecule, the improvement which comprises introducing into a reaction zone sulphur trioxide vapour and the amine in the form of finely divided liquid or in the form of vapour in a molar ratio of amine to sulphur trioxide of from 1.5:1 to 3.0:1 under conditions such that the reaction takes place and a temperature of 130°–200° C. is attained in the reaction zone.

2. A process according to claim 1, in which the said molar ratio is from 1.9:1 to 3:1.

3. A process according to claim 2, in which the said temperature is in the range 150–200° C.

4. A process according to claim 3, in which the amine is cyclohexylamine.

5. A process for the production of cyclohexylammonium N-cyclohexyl sulphamate, which comprises contacting in a reaction zone cyclohexylamine in the form of finely divided liquid or in the form of vapour with sulphur trioxide vapour in a molar ratio of cyclohexylamine to sulphur trioxide of 1.5:1 to 3.0:1 in an inert gaseous atmosphere under conditions such that the reaction takes place and the temperature attained is a temperature in the range of 150–200° C. in the reaction zone.

6. A process according to claim 5, in which the said molar ratio is from 1.95:1 to 3.0:1.

7. A process according to claim 6, in which said temperature in the reaction zone is within the range 175–190° C.

8. A process according to claim 5, in which the cyclohexylamine is introduced into the reaction zone in finely divided liquid form.

9. A process according to claim 8 in which the sulphur trioxide is introduced into the reaction zone diluted with an inert carrier gas and the concentration of the reactants, expressed as gram-mols of total reactants fed in per hour divided by the total volume of carrier gas in litres fed in per minute, is within the range 0.4–0.6.

10. A process according to claim 9, in which the cyclohexylamine is introduced into the reaction zone in a stream of inert carrier gas.

References Cited

UNITED STATES PATENTS

| 2,275,125 | 3/1942 | Audrieth et al. | 260—500 |
| 3,207,781 | 9/1965 | Shah | 260—500 |
| 3,266,430 | 12/1965 | Mhatre | 260—500 |
| 3,277,161 | 10/1966 | Sundberg et al. | 260—501 |

FOREIGN PATENTS

| 662,800 | 12/1951 | Great Britain. |
| 669,200 | 3/1952 | Great Britain. |
| 36/24076 | 1961 | Japan. |
| 38/17315 | 1963 | Japan. |

LEON ZITVER, *Primary Examiner.*

J. E. EVANS, *Assistant Examiner.*